(12) United States Patent
Tsuchiya

(10) Patent No.: US 7,072,148 B2
(45) Date of Patent: Jul. 4, 2006

(54) APPARATUS FOR THE SEALING OF A PIVOT ASSEMBLY USED IN A HARD DISK DRIVE

(75) Inventor: Kunihiro Tsuchiya, Miyota-Machi (JP)

(73) Assignee: Minebea Co., Ltd., Nagano (JP)

( * ) Notice: Subject to any disclaimer, the term of this patent is extended or adjusted under 35 U.S.C. 154(b) by 105 days.

(21) Appl. No.: 10/647,691

(22) Filed: Aug. 25, 2003

(65) Prior Publication Data

US 2004/0120079 A1    Jun. 24, 2004

(30) Foreign Application Priority Data

Sep. 3, 2002    (JP) ............................. 2002-258210

(51) Int. Cl.
*G11B 5/54*    (2006.01)

(52) U.S. Cl. ............... 360/265.3; 384/130; 360/265.2; 360/99.08

(58) Field of Classification Search ............. 360/265.2, 360/265.3, 265.4, 265.5, 265.6
See application file for complete search history.

(56) References Cited

U.S. PATENT DOCUMENTS 5,529,404 A    6/1996 Robinson et al. ........... 384/617

| | | | |
|---|---|---|---|
| 6,256,173 B1* | 7/2001 | Chee et al. ............... | 360/265.7 |
| 6,299,358 B1* | 10/2001 | Prater et al. ................. | 384/537 |
| 6,574,076 B1 | 6/2003 | Koyama ................... | 360/265.3 |
| 6,731,470 B1* | 5/2004 | Oveyssi .................... | 360/265.6 |
| 6,856,491 B1* | 2/2005 | Oveyssi .................... | 360/265.2 |
| 2002/0118490 A1* | 8/2002 | Macpherson et al. .... | 360/265.6 |

FOREIGN PATENT DOCUMENTS

| EP | 0 581 364 A1 | | 2/1994 |
|---|---|---|---|
| EP | 0 910 080 A2 | | 4/1999 |
| JP | 2001-084716 | | 3/2001 |
| JP | 2001-178065 A | * | 6/2001 |

* cited by examiner

*Primary Examiner*—Jefferson Evans
(74) *Attorney, Agent, or Firm*—John J. Skinner, Jr.; Schulte Roth & Zabel

(57) ABSTRACT

A pivot assembly that narrows the gap of the seal member as much as possible and can effectively restrain the diffusion of gas and dirt from the inside, and, moreover, can also solve the problem of out gas from a hub cap, is presented. The pivot assembly has ball bearings mated to both ends of a shaft, a spacer mated to a sleeve disposed between both ball bearings at the outer circumferences of these ball bearings, and has a hub cap member that covers the outside end face of the ball bearings at one end of the shaft. The hub cap is laser welded to the outer circumference of the shaft and the inner circumference of the sleeve, and after laser welding, is thin-width cut by a laser along the entire circumference at the radial middle part.

4 Claims, 4 Drawing Sheets

APPARATUS FOR THE SEALING OF A PIVOT ASSEMBLY USED IN A HARD DISK DRIVE

CROSS REFERENCE TO RELATED APPLICATIONS

This application claims priority from Japanese Patent Application No. 2002-258210 filed on Sep. 3, 2002.

BACKGROUND OF THE INVENTION

FIELD OF THE INVENTION

The present invention relates to a pivot assembly used as the bearing of a swing arm system actuator in a hard disk drive, and more particularly to seal technology that restrains the leakage of gas, grease, dirt and the like from the inside.

DESCRIPTION OF THE RELATED ART

As the above-mentioned kind of pivot assembly, for example, one in which ball bearings are fixed to both end parts of a shaft having a flange on one end part, and the spacing of both of these ball bearings is maintained by a sleeve mated to the ball bearings, and in addition, a hub cap is fixed to the outside of the other end of the shaft, are known.

Here, the hub cap is something provided so that the gas and dirt generated from the grease and the like provided to the ball bearings will not be discharged to the outside and so, for example, the inner circumference thereof is fixed to the outer circumference of the shaft, and at the outer circumference of the hub cap and the inner circumference of the sleeve a gap is formed in order to enable the relative rotation of both.

SUMMARY OF THE INVENTION

Now, the gap between the outer circumference hub cap and the inner circumference of the sleeve drains the function of the hub cap and making it as narrow as possible is desirable. However, in realizing that the dimensional control for the precision of the machining and assembly of the hub cap and sleeve must be extremely strictly carried out, moreover, when manufacturing errors of the hub cap and sleeve are taken into consideration, there is a limit. Formerly, because the hub cap was bonded to the shaft, gas was generated from the adhesive, and there was the problem that a harmful effect on the surface of the hard disk and magnetic head was brought about. In order to solve this kind of out gas problem, pressing the hub cap onto the shaft and fixing is also carried out. However, with fixing by means of pressing in, there are the problems that control of the allowance for pressing in is difficult and there is a lack of reliability of the fixing of the hub cap. Furthermore, pressing in and bonding and reliably fixing a hub cap to a shaft has been carried out, but in this case the problem of out gas from the adhesive remains as before.

Furthermore, in the conventional pivot assembly the ball bearing and shaft and sleeve were fixed by means of an adhesive. In this case, before all the inner rings and outer rings are completely bonded, applying pre-load to the ball bearings and eliminating play is carried out. As for this pre-load, a pivot assembly is attached to a jig, and by means of the spring strength of the jig or the weight of a weight, the inner ring of the ball bearing of one side is pressed to the side of the other ball bearing, and is applied so as to eliminate the axial internal clearance that exists between the inner and outer rings and balls. For this reason, at the inner ring of the ball bearing of the side that has been pressed, that bonding agent is regarded as in an unhardened state so as to be able to move in the axial direction. And the pivot assembly is heated in a heating furnace in the state in which a pre-load has been given to a ball bearing by a jig, and the unhardened adhesive is completely hardened.

In this way, with the conventional pivot assembly, because the pivot assembly must be carried into a heating furnace in the state of being attached to a jig in order to fix the pre-load applied state in a ball bearing, a large quantity of jigs are required, and moreover, jigs must be made of a material that is heat resistant. For this reason, there was not just the problem that, because of the expense of the jigs, the manufacturing cost of a pivot assembly became comparatively high, but the work of the attachment and removal of jigs to and from the pivot assemblies becomes necessary and the number of man-hours of work increases. Furthermore, even if a UV anaerobic adhesive is used as a bonding agent, only the necessity to make the jigs heat resistant is eliminated and a problem approximately equal to the above-mentioned remains.

Consequently, the present invention aims at offering a pivot assembly provided with a superior seal function which does not require rigorous dimensional control with respect to the hub cap and the sleeve, and moreover, which is not affected by manufacturing errors, and which can narrow as much as possible the gap that makes possible the relative rotation of the hub cap and the sleeve, and which, consequently, can most effectively restrain the leakage of gas, grease, dirt and the like from the inside. Furthermore, the present invention aims to provide a pivot assembly which can reliably fix a hub cap and, in addition, can solve the problem of out gas, of course, and can reduce the expense and man-hours incidental to the pre-loading of a ball bearing.

The present invention is characterized in that in a pivot assembly for hard disk drive use in which ball bearings have been mated with both ends of a shaft, a sleeve having an integrally formed spacer part (inner wall part) has been disposed between both said ball bearings on the outer circumference of these ball bearings, and, on at least one end of the shaft, a seal member that covers the outer end face of the ball bearing has been provided, the seal member is fixed to the outer circumference of the shaft and the inner circumference of the sleeve, and, after fixing, small thickness cutting is done along the entire circumference at the middle part in the radial direction.

In the pivot assembly for hard disk drive use (hereinafter, called simply, "pivot assembly") of the above-mentioned constitution, since the seal member is fixed to the outer circumference of the shaft and the inner circumference of the sleeve, and, after fixing, small thickness cutting is done along the entire circumference at the middle part in the radial direction, the shaft and sleeve can relatively rotate. Furthermore, the size of the gap of the cut part can be arbitrarily selected by suitably selecting the cutting means, and in addition, can be made fixed without being affected by the machining errors of the seal member and the sleeve. Consequently, that gap can be made as small as possible and the leakage of gas, grease and dirt from the inside can be effectively restrained.

Here, fixing the seal member by means of laser welding to the outer circumference of the shaft and the inner circumference of the sleeve is desirable. By means of this, the seal member can be fixed reliably, and moreover, without imparting heat damage on the ball bearing. In addition, the problem of out gas from the seal member can be solved. Furthermore, in cases based on the conventional pressing in and bonding, grease seepage (oil migration) from the gap left behind occurred, but with seam welding by means of a laser that kind of trouble can be solved.

Furthermore, cutting the seal member by means of a laser is desirable. If done with a laser, thin width cutting of only the seal member becomes possible at a width of, for example, 0.1 mm or less, by adjusting the laser conditions by regulating the diameter and output of the laser beam. Furthermore, cutting the seal member on the diagonal with respect to the axis of the shaft is desirable. By means of this it becomes difficult for the internal gas, grease and dirt to pass through the gap of the cut part and at the same time an action that heightens the labyrinth function is exhibited.

Furthermore, with the pivot assembly of the present invention, the pre-load work can be simplified as follows. That is, the inner ring of a ball bearing that has been pressed in by means of a pre-load is placed in a state not fixed with respect to the shaft, and from the outer side of that inner ring the seal member mates with the shaft. And, from the outer side of the seal member a prescribed pre-load is applied and the inner ring is pressed in, and, in that state, the seal member is laser welded to the shaft and sleeve. By means of this, the position of that inner ring is fixed, and the state in which a pre-load has been imparted to a ball bearing is maintained.

This kind of pre-load work can be automatically carried out by means of a device provided with a laser welding machine, and a pivot assembly for which a pre-load has been set can be carried into a heating furnace and ultraviolet ray irradiating equipment and the adhesive can be hardened after the seal part has been cut by a laser.

In the above-mentioned kind of pre-load work, the above-mentioned outer ring is not fixed to the shaft by means of a bonding agent, and, before the pre-load work, another inner ring and outer ring can be fixed to a shaft and sleeve by means of bonding and let stand. Furthermore, the above-mentioned outer ring can also be fixed to a shaft by means of an adhesive. In this case, after a pre-load has been set, the pivot assembly is carried into a heating furnace and ultraviolet ray irradiating equipment and the adhesive is hardened. Consequently, an adhesive that fixes another inner ring and outer ring also is hardened at that time simultaneously. Furthermore, at the time of setting the pre-load, an inner ring and outer ring, other than the inner ring being pressed in, can also be fixed to a shaft and sleeve by means of pressing in.

In this way, according to the pivot assembly of the present invention, since the seam member is pressed in and a pre-load is imparted to an inner ring or outer ring, and in that state, the seal member can be laser welded to a shaft and sleeve, a jig for the purpose of hardening an adhesive in a heating furnace and the like as in the above-mentioned prior art is unnecessary. Consequently, the jig manufacturing expense and the attachment and removal work with respect to the pivot assembly become unnecessary. Furthermore, since the setting of the pre-load that conventionally was carried out by means of a step such as bonding the inner ring to the shaft can be omitted due to the fixing of the seal member, the manufacturing man-hours can be further reduced and the manufacturing expense can be greatly lowered.

Furthermore, formerly, the gap of the thin width cut that performed the labyrinth function, like the gap of the outer circumference of the seal member and the inner face of the sleeve, or the gap of the inner circumference of the seal member and the outer circumference of the shaft, could only be disposed at the respective determined positions, but in the present invention, because forming the thin width gap at an arbitrary position in the radial direction of the seal member is possible, the labyrinth function can be most effectively exhibited in product manufacturing.

Furthermore, if the seal member is seam welded with a laser at the outer circumference of the shaft and the inner circumference of the sleeve, the airtightness is heightened and it can be made a still more effective countermeasure with respect to oil migration.

There is no limit on the laser welding laser source, for example, a YAG laser can be used. Furthermore, laser welding can be carried out over the entire circumference of the contact part of the seal member with the shaft or sleeve (seam welding), or can be carried out in multiple mutually separated places along the contact part (spot welding). Furthermore, with the present invention a seal member is provided at one end side of a shaft, at the other end part of a shaft a flange is formed and the discharge of dirt and the like from the inner part can be suppressed. Or a seal member can also be provided at both end part sides of a shaft and, in this case, the machining of the shaft is limited and it is advantageous from the standpoint of manufacturing costs.

DETAILED DESCRIPTION

Figure 1:
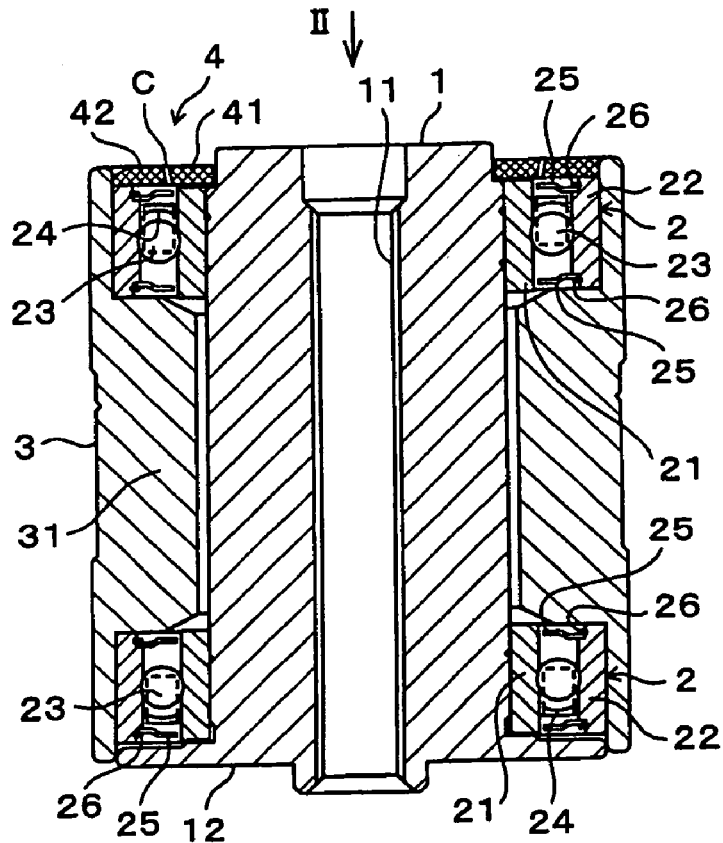
FIG. 1 is a side cross-section view that shows the pivot assembly of an embodiment of the present invention.

Now, the present invention is a pivot assembly for hard disk drive use, accordingly, the laser welded seal member is a rather thin member of a thickness of 0.3~1.5 mm.

For this reason, because with spot welding by means of electric resistance welding and gas welding the welding part reaches the inner ring and outer ring of the ball bearing and bearing precision is lowered by that thermal effect, they could not be used, and the use and the like of seam welding could not be considered at all. With the present invention, because the seal member is welded to the shaft and sleeve by laser welding, by narrowing down the spot diameter of the laser beam to approximately 0.4 mm, for example, the depth of the welded part can be made approximately 0.2 mm. By means of this, the welded part does not reach the inner ring and the like and a lowering of the bearing precision can be prevented.

Furthermore, because the laser beam spot is narrowed down as mentioned above and welding is carried out, when a gap exists between the shaft and sleeve and the seal member, both are not welded normally and a welding failure occurs. Consequently, in order to make it so that a gap does not occur between the two, it is desirable that the fit relationship of the seal member with the shaft and sleeve be one that is slightly squeezed in (loosely pressed in). However, even if both are squeezed in, this does not mean that a gap and concave part is formed in the part which the laser beam irradiates. For example, when a chamfer is formed on the inner circumferential edge of the seal member, a concave part is formed between that chamfer and the outer circumference of the shaft, and when a laser beam is irradiated there a welding failure occurs.

That is, because a part equivalent to the width dimension of the concave part that corresponds to the laser spot diameter is a space while originally being a part that should be welded, as a whole, the welding thickness part is reduced. Because the laser energy increases and the weld depth becomes deeper when the laser spot diameter is made larger as a countermeasure thereto, the weld part reaches to the inner ring or the outer ring. As a result, deformation and the like of the formed part occur and become a cause of a decrease in bearing performance.

Consequently, as for the seal member, closely sticking an edge part that forms a sharp edge to the outer circumference of a shaft and the inner circumference of a sleeve, and fixing by means of laser welding at that part, is desirable. Here, the sharp edge in the present invention means the case in which the radius is 0.1 mm or less when the cross-section of the edge part has been made a circular arc shape, and when the seal member is machined by turning and grinding, means the state of the edge part with the outer circumference or inner circumference machined and left as is. That is, whether or not the two surfaces that constitute a sharp edge form a sharp corner is not a problem.

Due to a reason the same as the above-mentioned, when a seal member is formed by means of press blanking, it is desirable that the edge part of the surface facing the direction of that press blanking be fastened by laser welding to the outer circumference of the shaft and the inner circumference of the sleeve. That is, when a seal member is stamped by a punch and die, at the surface of the side where the punch penetrates, the thickness of the edge part is brought into the inside and a chamfer of the circular arc shape is formed, but at the side punched out by the punch, on the contrary, thickness die wear or burrs occur and the edge part sticks out. Consequently, by placing that kind of protruding part on the weld side, a gap and concave part between the seal member and shaft or sleeve does not occur, and the laser beam is properly irradiated. Furthermore, since a protruding part, formed due to die wear or burrs, is fused, the protruding part welded by the laser beam is fixed like built-up welding and can weld more securely.

One embodiment of the present invention is explained with reference to FIG. 1~FIG. 7. In these figures reference numeral 1 is a shaft.

A screw hole 11 is formed in the center of the shaft 1 and the pivot assembly is attached to the hard disk drive by a bolt screwed together at this screw hole 11. At the lower edge part of the shaft 1 a flange 12 is formed. On the outer circumference of the shaft 1 a ball bearing 2 caused to contact the end face is mated with the flange 12.

The ball bearing 2 is provided with an inner ring 21 and an outer ring 22 and multiple balls 23 that can roll in a circumferential direction between them. The balls 23 are held at regular intervals in a circumferential direction by a retainer 24. The opening part facing the flange 12 side between the inner ring 21 and the outer ring 22 is blocked by a seal 25. Reference numeral 26 in the figure is a snap ring in order to fix the seal 25. Furthermore, the present invention can also be applied to an open bearing which does not maintain a seal 25 like that mentioned above.

Also at the top end part of the shaft 1 ball bearings 2, the same as the above-mentioned, are pressed in. At the outer circumference of these two ball bearings 2, a sleeve 3 has been mated therewith. In the center part in the axial direction of the sleeve 3, a spacer part (inner wall part) 31, with an inner diameter even smaller than both end parts, is formed integrally with and continuous thereto. At both end faces of the spacer part 31 the outer rings 22 of the ball bearings 2 make contact, and by means of this the outer rings 22 are separated from each other by a set interval. At the upper end part of the shaft 1 a hub cap (seal member) 4 is disposed. The hub cap 4 is cut to a thin width along the entire circumference at the middle part in the radial direction thereof, divided into an inner circumference part 41 and an outer circumference part 42 with that cut part C in between.

Figure 2:
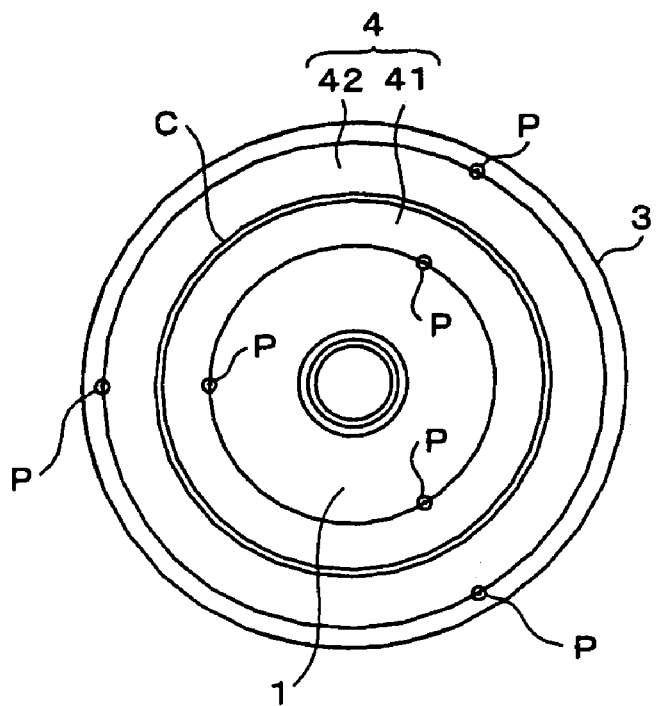
FIG. 2 is a FIG. 1 arrow II direction view.
Figure 3:
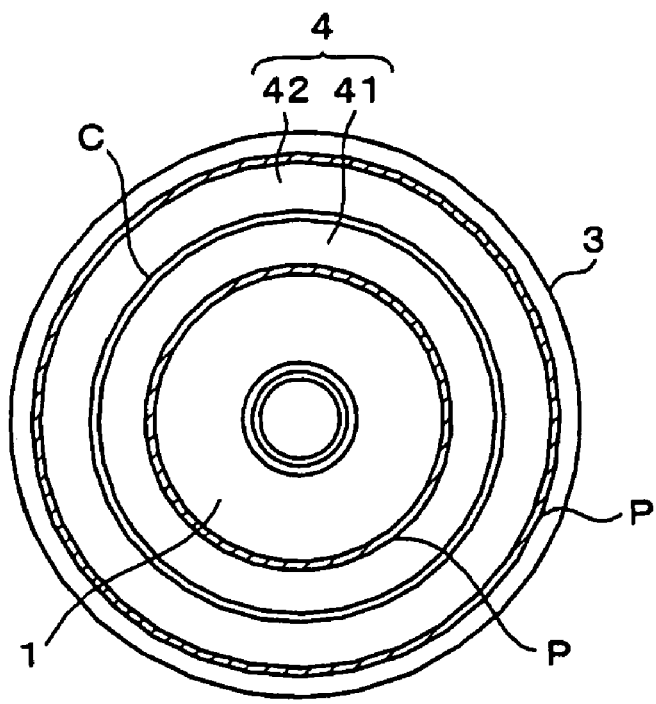
FIG. 3 is a view that shows a modified example of FIG. 2.
Figure 4:
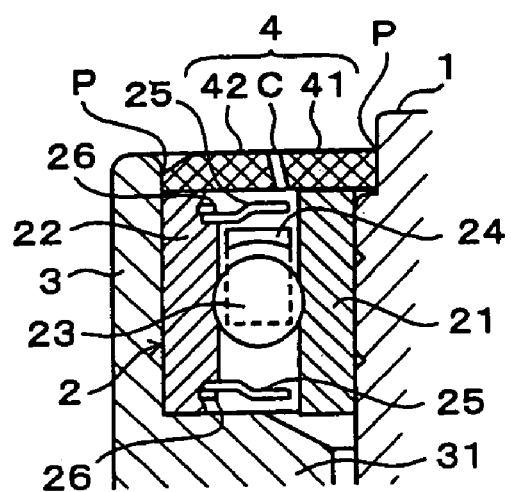
FIG. 4 is an enlarged side cross-section view of part of the ball bearing.

The inner circumference part 41 is laser welded to the outer circumference of the shaft 1, and the outer circumference part 42 is laser welded to the inner circumference of the sleeve 3. In FIG. 2 reference numeral P indicates a nugget due to welding, and, as shown in FIG. 2, the inner circumference part 41 and the outer circumference part 42 are spot welded to the shaft 1 and the sleeve 3 at multiple places (three places in this embodiment) separated at regular intervals in the circumferential direction. Furthermore, as shown in FIG. 3, laser welding the entire circumference of the inner circumference part 41 and the outer circumference part 42 can also be done.

To the outer circumference of the pivot assembly of the above-mentioned configuration, the base of a swing arm provided with a magnetic head at the tip is attached. The swing arm is caused to move circularly centered on the pivot assembly by means of a drive mechanism such as a voice coil motor, and the magnetic head of the tip is caused to move along the surface of the hard disk.

The above-mentioned kind of pivot assembly is manufactured in the following way. First, a ball bearing 2 is mated to the outer circumference of the lower end of a shaft 1 by application of an adhesive therebetween. Concurrently, a ball bearing 2 is mated to the outer circumference of the upper end of a sleeve 3 by application of an adhesive therebetween. Next, the sleeve 3 is mated to the shaft 1 by an adhesive being applied to the outer circumference of the upper end of shaft 1 and the inner circumference of the lower end of sleeve 3.

Figure 5:
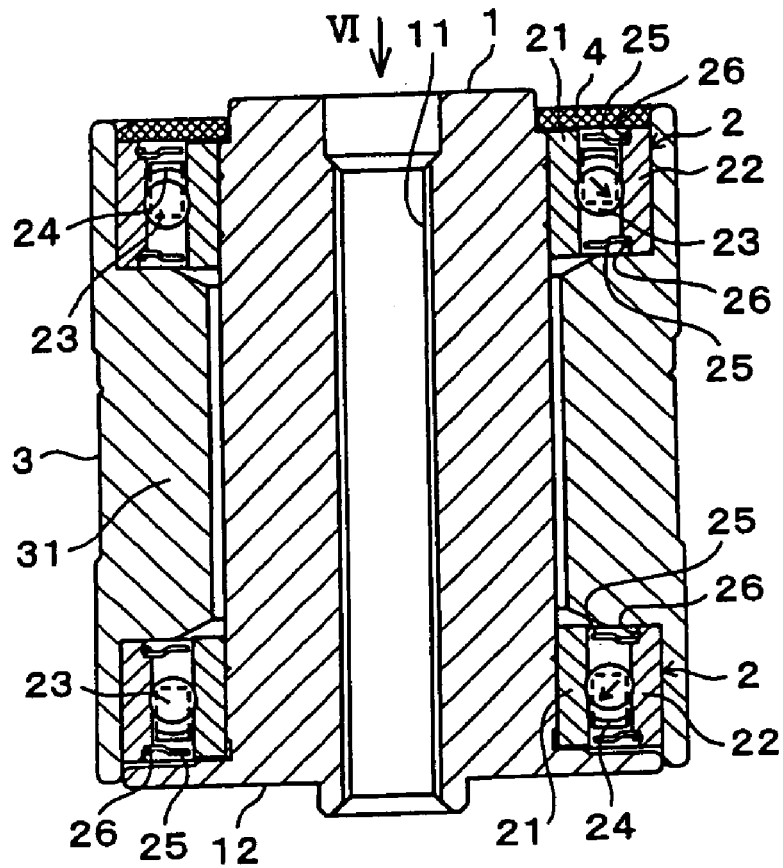
FIG. 5 is a side cross-section view that shows the state of the hub cap of the pivot assembly of an embodiment before cutting.
Figure 6:
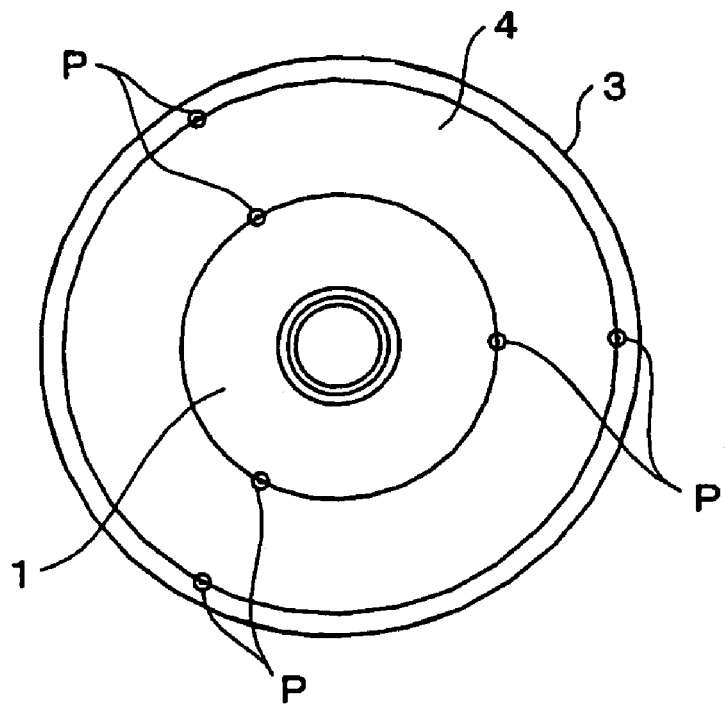
FIG. 6 is the FIG. 5 arrow VI direction view.
Figure 7:
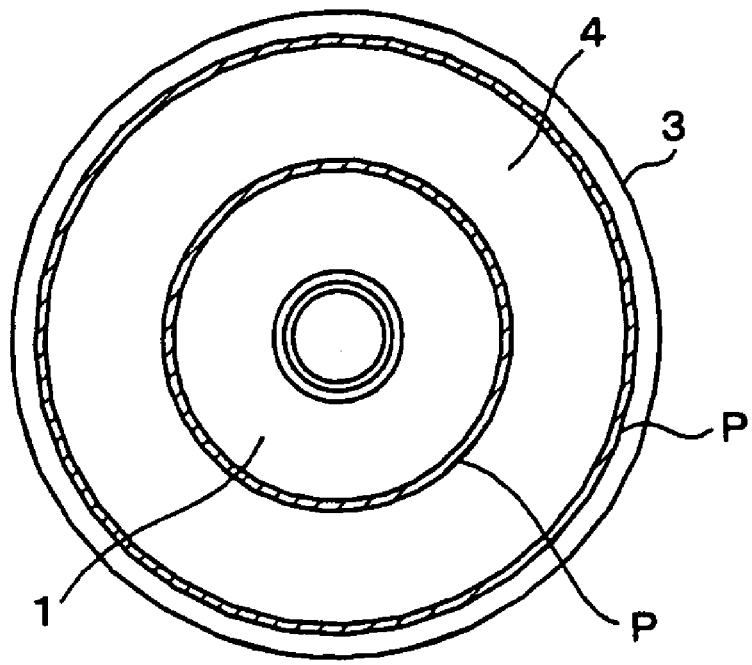
FIG. 7 is a view that shows a modified example of FIG. 6.

Next, as shown in FIG. 5, a hub cap 4 is mated to the upper end part of a shaft 1 and the end surface thereof is caused to contact the ball bearing 2. And, the hub cap 4 is pressed and pre-load is applied. In this case, like a pre-load imparted to the inner ring 21, the part of the inner circumference side of the hub cap 4, rather than the part of the outer circumference side, is made thick-walled and left so as to stick out towards the inner ring 21 side. When a pre-load is applied to the inner ring 21, the force thereof is sequentially transmitted with the ball 23, the outer ring 22, the spacer part 31 of the sleeve 3, the outer ring 22, and the inner ring 21, and this acts so that the inner ring 21 pushes the outer ring 22 out to the outside via the ball 23. By means of this, the play between the inner ring 21, the ball 23 and the outer ring 22 is eliminated and rotating precision is obtained. And, the state in which this kind of pre-load has been applied is maintained, and the inner and outer circumferences of the hub cap 4 are laser welded. By means of this the hub cap 4 is fixed to the shaft 1 and the sleeve 3, and the pre-load that has been applied is maintained in the ball bearing 2.

Next, a hub cap 4 fixed as mentioned above is cut in a thin width by a laser. Laser cutting is carried out irradiating a laser beam from diagonally upwards at the radial proper position of the hub cap 4 while rotating the pivot assembly. Next, the pivot assembly is carried into the heating furnace or ultraviolet ray irradiating equipment corresponding to the type of adhesive, and the unhardened adhesive is completely hardened. By means of this, the shaft 1, ball bearing 2 and sleeve 3 are fixed to each other by means of adhesive.

The adhesive hardening method differs depending on the bonding agent used, and in the case of a UV adhesive, ultraviolet rays are irradiated to the application part to cause hardening, and in the case of anaerobic adhesive, let stand, and in the case of epoxy system and the like thermo-hardening adhesive, put into a heating oven heat and harden. These bonding agents have their respective characteristics and it is necessary to use them properly depending on the place of use; for example, because a UV adhesive is applicable to the extent that ultraviolet rays can be irradiated, gap bonding is unsuitable. On the other hand, anaerobic adhesive, if heated in order to harden, is reliable, but heating equipment and much trouble are required. Generally, in the assembly of a pivot assembly, a UV anaerobic bonding agent or a thermo-hardening adhesive are used, and, because of the aspects of reliability (bonding strength) and safety (out gas), most of the time a thermo-hardening adhesive is selected. In the case of a place where UV irradiation is possible after application of the bonding agent, for example, the bonding of a shaft 1 and a ball bearing 2, anaerobic adhesive is effective for the bearing inner circumference part and the shaft mating part, the bonding agent that has protruded at the time of mating can be hardened by UV irradiation (because the part that bulges out is exposed to the outside, UV irradiation is possible). Consequently, UV anaerobic adhesive that has both UV and anaerobic action is suitable. Furthermore, recently there is also the use of adhesives that have three actions, that is, UV anaerobic thermo-hardening adhesives. However, from the aspects of reliability of the bond and the reduction of out gas, a thermo-hardening type adhesive is suitable.

In a pivot assembly of the above-mentioned constitution, since the hub cap 4 is fixed to the outer circumference of the shaft 1 and the inner circumference of the sleeve 3, and, after fixing, is laser cut along the entire circumference at the radial middle part, the size of the gap of the cut part C is narrowed as much as possible and the diffusion of gas and dirt from the inside can be effectively restrained.

Particularly, in the above-mentioned embodiment, because the hub cap 4 is fixed by means of laser welding to the outer circumference of the shaft 1 and the inner circumference of the sleeve 3, that the hub cap 4 can be reliably fixed is a matter of course, and the problem of out gas from the hub cap 4 can be solved. In particular, the hub cap 4 approaches the disk assembly part of the hard disk drive the closest and, when this has been fixed by means of an adhesive, the out gas generated from the adhesive is liable to directly exert an influence on the disk, but if based on laser welding without using a bonding agent, that kind of problem can be solved once and for all. Furthermore, because the hub cap 4 is fixed to the shaft 1 and the sleeve 3 and the pre-load is fixed, the pivot assembly can be provided to the final hardening treatment without using a jig.

Consequently, the jig manufacturing expense and the work of attachment and removal with respect to the pivot assembly become unnecessary, and the manufacturing expense can be reduced. Furthermore, because the cut part C of the hub cap 4 is made at a diagonal with respect to the shaft line of the pivot assembly, there is also the advantage that the action and effect of the labyrinth function is heightened and gas, grease and dirt from the inside becomes still harder to be diffused. In addition, since a thin-width cut part can be formed at an arbitrary position in the radial direction, a design that exhibits the optimal labyrinth function becomes possible, moreover, because seam welding is possible the problem of oil migration also can be practically completely solved.

According to the present invention as explained above, because a seal member is fixed to the outer circumference of a shaft and the inner circumference of a sleeve, and, after fixing, is cut along the entire circumference at the radial middle part, the gap of the thin width cut part of the seal member is made as narrow as possible, and the discharge of gas, grease and dirt from the inside can be effectively restrained and the like effects can be obtained.

What is claimed is:

1. An apparatus for a pivot assembly comprising:
   at least one pair of ball bearings;
   a shaft having a first end and a second end to each of which one of the at least one pair of ball bearings has been mated;
   a sleeve, having an integrally formed inner wall and disposed between the at least one pair of ball bearings and the first end of the shaft, such that the sleeve is mated to an outer circumference of the at least one pair of ball bearings; and
   a seal member fixed to an outer circumference of the shaft and to an inner circumference of the sleeve, so as to cover an outer end face of the at least one ball bearing, wherein the seal member has a cut in the circumference of the seal member, the cut positioned in a middle portion of the seal member along a radial direction of the seal member.

2. The apparatus according to claim 1, wherein the seal member is fixed by welding to the outer circumference of the shaft.

3. The apparatus according to claim 1, wherein the cut in the seal member extends along an entire circumference of the seal member.

4. The apparatus according to claim 3, wherein the cut is of a thin-width and in a direction inclined with respect to an axis line of the shaft.

* * * * *